(12) United States Patent
Park et al.

(10) Patent No.: US 12,283,764 B2
(45) Date of Patent: Apr. 22, 2025

(54) BIDIRECTIONAL SIGNAL PIN MODULE, POWER MODULE INCLUDING THE SAME, AND METHOD OF MANUFACTURING THE SAME

(71) Applicant: HYUNDAI MOBIS Co., Ltd., Seoul (KR)

(72) Inventors: Se Min Park, Hwaseong-si (KR); Ji Hye Jeong, Seongnam-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 272 days.

(21) Appl. No.: 17/556,424

(22) Filed: Dec. 20, 2021

(65) Prior Publication Data

US 2023/0057923 A1  Feb. 23, 2023

(30) Foreign Application Priority Data

Aug. 20, 2021  (KR) ........................ 10-2021-0110482

(51) Int. Cl.
*H01R 12/71* (2011.01)
*H01R 12/58* (2011.01)
*H01R 12/70* (2011.01)
*H01R 13/05* (2006.01)

(52) U.S. Cl.
CPC ......... *H01R 12/716* (2013.01); *H01R 12/585* (2013.01); *H01R 12/7064* (2013.01); *H01R 13/05* (2013.01)

(58) Field of Classification Search
CPC .............................. H01R 12/716; H01R 12/585; H01R 12/7064; H01R 13/05; H01R 12/57; H01R 13/052; H01R 12/737; Y02T 10/70; H05K 1/145

See application file for complete search history.

(56) References Cited

U.S. PATENT DOCUMENTS

| | | | | |
|---|---|---|---|---|
| 3,034,084 A | * | 5/1962 | Schmier | H01R 31/02 439/652 |
| 3,208,027 A | * | 9/1965 | Johnson | H01R 12/718 439/224 |
| 4,571,014 A | * | 2/1986 | Robin | H05K 9/0039 439/607.07 |
| 4,810,215 A | * | 3/1989 | Kaneko | H01R 12/716 439/246 |
| 5,374,204 A | * | 12/1994 | Foley | H01R 13/114 439/82 |
| 5,490,787 A | * | 2/1996 | Bowman | H01R 12/724 439/79 |
| 5,595,513 A | * | 1/1997 | Kondo | H01R 43/24 439/736 |

(Continued)

FOREIGN PATENT DOCUMENTS

| | | |
|---|---|---|
| DE | 3146491 A1 | 5/1982 |
| JP | 10-289769 A | 10/1998 |

(Continued)

*Primary Examiner* — Abdullah A Riyami
*Assistant Examiner* — Nelson R. Burgos-Guntin
(74) *Attorney, Agent, or Firm* — NSIP Law

(57) ABSTRACT

A bidirectional signal pin module includes: a signal pin configured to electrically connect two objects; and a socket having a bent body shape including bent portions, and configured to fix the signal pin in either one of a horizontal direction and a vertical direction.

14 Claims, 4 Drawing Sheets

(56) References Cited

U.S. PATENT DOCUMENTS

| | | | | |
|---|---|---|---|---|
| 5,823,795 A * | 10/1998 | Schumacher | H01R 12/7082 | 439/74 |
| 5,895,278 A * | 4/1999 | Humphrey | H01R 13/6471 | 439/67 |
| 6,030,241 A | 2/2000 | Chiba | | |
| 6,238,225 B1 * | 5/2001 | Middlehurst | G06F 13/409 | 439/721 |
| 6,305,951 B1 * | 10/2001 | Shih | H01R 12/716 | 439/541.5 |
| 6,305,988 B1 * | 10/2001 | Arakawa | H01R 33/7635 | 439/683 |
| 6,464,542 B1 | 10/2002 | Lee | | |
| 6,547,578 B2 * | 4/2003 | Huang | H01R 25/003 | 439/224 |
| 6,616,459 B2 * | 9/2003 | Norris | H01R 12/585 | 439/943 |
| 6,780,059 B1 * | 8/2004 | Payne | H01R 12/714 | 439/607.39 |
| 6,830,465 B2 * | 12/2004 | Norris | H04Q 1/14 | 439/75 |
| 6,848,922 B2 * | 2/2005 | Coughlan | H01R 13/53 | 439/181 |
| 7,845,955 B2 | 12/2010 | Nakayama et al. | | |
| 8,002,573 B2 * | 8/2011 | Elsaesser | H01R 12/515 | 439/416 |
| 9,147,952 B2 * | 9/2015 | Kikuchi | H01R 12/7082 | |
| 10,522,945 B2 * | 12/2019 | Schneider | H01R 13/10 | |
| 10,530,100 B1 * | 1/2020 | Henry | H01R 13/6597 | |
| 10,877,232 B1 * | 12/2020 | Bailey | G02B 6/4284 | |
| 10,879,643 B2 * | 12/2020 | Astbury | H01R 13/6477 | |
| 11,276,966 B1 * | 3/2022 | Costello | H01R 13/514 | |
| 11,469,554 B2 * | 10/2022 | Ellison | H01R 13/6471 | |
| 11,757,215 B2 * | 9/2023 | Xu | H01R 12/75 | 439/55 |
| 2002/0048995 A1 * | 4/2002 | Shindo | H01R 13/6585 | 439/607.07 |
| 2002/0177339 A1 * | 11/2002 | Huang | H01R 27/02 | 439/222 |
| 2006/0046525 A1 * | 3/2006 | Mark | H01R 12/57 | 439/65 |
| 2007/0279709 A1 * | 12/2007 | Yamada | H04N 1/00519 | 358/497 |
| 2008/0123270 A1 * | 5/2008 | Kim | H05K 7/20963 | 361/679.01 |
| 2014/0045390 A1 * | 2/2014 | Wittig | H01R 12/585 | 439/825 |
| 2015/0016782 A1 * | 1/2015 | Su | G02B 6/4284 | 385/88 |
| 2015/0207271 A1 * | 7/2015 | Si | H01R 31/02 | 439/628 |
| 2015/0328993 A1 * | 11/2015 | Shin | H05K 7/20927 | 307/10.1 |
| 2015/0372409 A1 * | 12/2015 | Hagemeier | H01R 13/5202 | 439/733.1 |
| 2016/0056552 A1 * | 2/2016 | Geske | H01R 13/6272 | |
| 2016/0164202 A1 * | 6/2016 | Endo | H01R 12/585 | 439/74 |
| 2016/0311329 A1 * | 10/2016 | Rodriguez | H02J 7/00 | |
| 2016/0315022 A1 * | 10/2016 | Egusa | H01R 13/405 | |
| 2016/0353563 A1 * | 12/2016 | Morimoto | H05K 5/0026 | |
| 2018/0147947 A1 * | 5/2018 | Gebhart | B60L 53/14 | |
| 2018/0278329 A1 * | 9/2018 | Chou | G02B 6/428 | |
| 2019/0140375 A1 * | 5/2019 | Schafmeister | H01R 4/48365 | |
| 2019/0296467 A1 * | 9/2019 | Ito | H01R 13/41 | |
| 2019/0333702 A1 * | 10/2019 | Song | H01G 11/76 | |
| 2020/0259336 A1 * | 8/2020 | Rao | H02B 1/056 | |
| 2020/0292138 A1 * | 9/2020 | Crayford | F21K 9/235 | |
| 2021/0234315 A1 * | 7/2021 | Ellison | H01R 13/502 | |
| 2022/0063527 A1 * | 3/2022 | Awad Alla | B60L 53/20 | |
| 2022/0121736 A1 * | 4/2022 | Iglesias | G06F 21/36 | |
| 2023/0057923 A1 * | 2/2023 | Park | H01R 13/052 | |
| 2023/0062661 A1 * | 3/2023 | Johnescu | H01R 13/6477 | |
| 2023/0204884 A1 * | 6/2023 | Cao | H01R 13/518 | 385/92 |
| 2023/0318409 A1 * | 10/2023 | Tian | H02K 5/225 | 310/71 |

FOREIGN PATENT DOCUMENTS

| | | |
|---|---|---|
| JP | 5379474 B2 | 12/2013 |
| JP | 2021-103905 A | 7/2021 |
| KR | 10-2005-0121003 A | 12/2005 |
| KR | 10-2010-0104800 A | 9/2010 |
| KR | 10-2013-0013341 A | 2/2013 |
| KR | 10-2013-0021570 A | 3/2013 |
| KR | 10-2016-0068670 A | 6/2016 |
| KR | 10-2017-0005992 A | 1/2017 |
| KR | 10-2018-0051943 A | 5/2018 |
| KR | 10-1920634 B1 | 11/2018 |
| KR | 10-2106970 B1 | 5/2020 |
| WO | WO 2009/106581 A2 | 9/2009 |

* cited by examiner

BIDIRECTIONAL SIGNAL PIN MODULE, POWER MODULE INCLUDING THE SAME, AND METHOD OF MANUFACTURING THE SAME

CROSS-REFERENCE TO RELATED APPLICATIONS

This application claims the benefit under 35 USC § 119(a) of Korean Patent Application No. 10-2021-0110482, filed on Aug. 20, 2021 in the Korean Intellectual Property Office, the entire disclosure of which is incorporated herein by reference for all purposes.

BACKGROUND

1. Field

The disclosure herein relates to a bidirectional signal pin module and a power module including the same.

Particularly, the disclosure herein relates to a technology of inserting a signal pin into a bidirectional, that is, vertical and horizontal, signal pin socket in one of two directions to connect a power board and a control board in order to effectively arrange components of a power module.

2. Discussion of Related Art

As the market for electrified vehicles, such as hybrid vehicles and electric vehicles, grows, the demand for power converters, which serve to supply and control power, is increasing, and particularly, innovative development of power modules, which are key components, is attracting attention.

A motor is a main power source of an electrified vehicle, and the motor receives power from a battery so as to drive the vehicle.

A power converter serves to seamlessly supply power of a battery to a motor and to control the power, and particularly, since the performance of a power module, which is a key component of the power converter, greatly affects power efficiency, innovative development is being conducted in various fields of simplifying a structure, increasing a density, lowering a weight, and improving the performance of the power module.

The present technology is a technology for developing a high density and high performance product by applying a bidirectional signal pin module of a power module.

The power module includes a power board, a control board, and a signal pin which electrically connects the power board and the control board.

The signal pin serves to transmit a signal of the control board to a switching element of the power board.

FIG. 1 is a perspective view illustrating a conventional unidirectional signal pin in a vertical direction, and FIG. 2 is a perspective view illustrating a structure of a conventional power module.

Referring to FIGS. 1 and 2, in the conventional power module, a power board is connected to a control board through a unidirectional signal pin in the vertical or horizontal direction and is used.

However, when the power board and the control board are connected through the unidirectional signal pin, there is a restriction in a layout of components in the power module, and thus inefficiency of a degree of design freedom and space utilization occurs.

Accordingly, there is a requirement for developing a structure for improving a degree of design freedom and space utilization and simplifying and miniaturizing a structure of a power module.

RELATED ART

Patent Document

Korean Patent Publication No. 10-2013-0013341

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a bidirectional signal pin module includes: a signal pin configured to electrically connect two objects; and a socket having a bent body shape including bent portions, and configured to fix the signal pin in either one of a horizontal direction and a vertical direction.

The bent portions of the socket may include holes disposed in the horizontal direction or the vertical direction, and configured to be coupled to the signal pin.

The signal pin may be configured to be coupled to the socket in a press-fit connection manner.

In another general aspect, a power module includes: a power board which configured to receive a signal; a control board configured to transmit the signal to the power board; and a bidirectional signal pin module electrically connecting the power board and the control board to each other.

The control board may have either one of a current control property and a temperature control property.

The bidirectional signal pin module may include: a signal pin configured to have the signal transmitted or received therethrough; and a socket fixing the signal pin.

The signal pin may be fixed to the socket in either one of a horizontal direction and a vertical direction.

The bidirectional signal pin module may connect the power board and the control board to each other in either one of a horizontal direction and a vertical direction.

The bidirectional signal pin module may be individually designed to connect the control board to the power board.

The power module may further include: another control board configured to transmit another signal to the power board; and another bidirectional signal pin module electrically connecting the power board and the other control board to each other.

The bidirectional signal pin module may connect the power board and the control board to each other in a horizontal direction. The other bidirectional signal pin module may connect the power board and the other control board to each other in a vertical direction.

In another general aspect, a method of manufacturing a power module includes: preparing a power board configured to receive a signal; preparing a control board configured to transmit the signal to the power board; preparing a bidirectional signal pin module electrically connecting the power board and the control board to each other; and electrically connecting the power board and the control board to each other through the bidirectional signal pin module.

The preparing of the control board may include preparing the control board to have either one of a current control property and a temperature control property.

The preparing of the bidirectional signal pin module may include fixing a signal pin, configured to have the signal is transmitted or received therethrough, to a socket.

The method may further include fixing the signal pin to the socket in either one of a horizontal direction and a vertical direction, through a press-fit process.

Other features and aspects will be apparent from the following detailed description, the drawings, and the claims.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Figure 1:
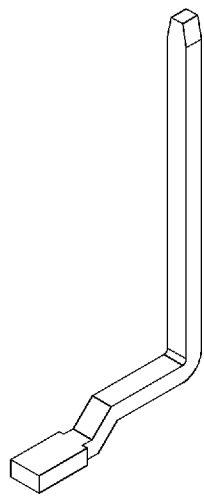
FIG. 1 is a perspective view illustrating a conventional unidirectional signal pin in a vertical direction.
Figure 2:
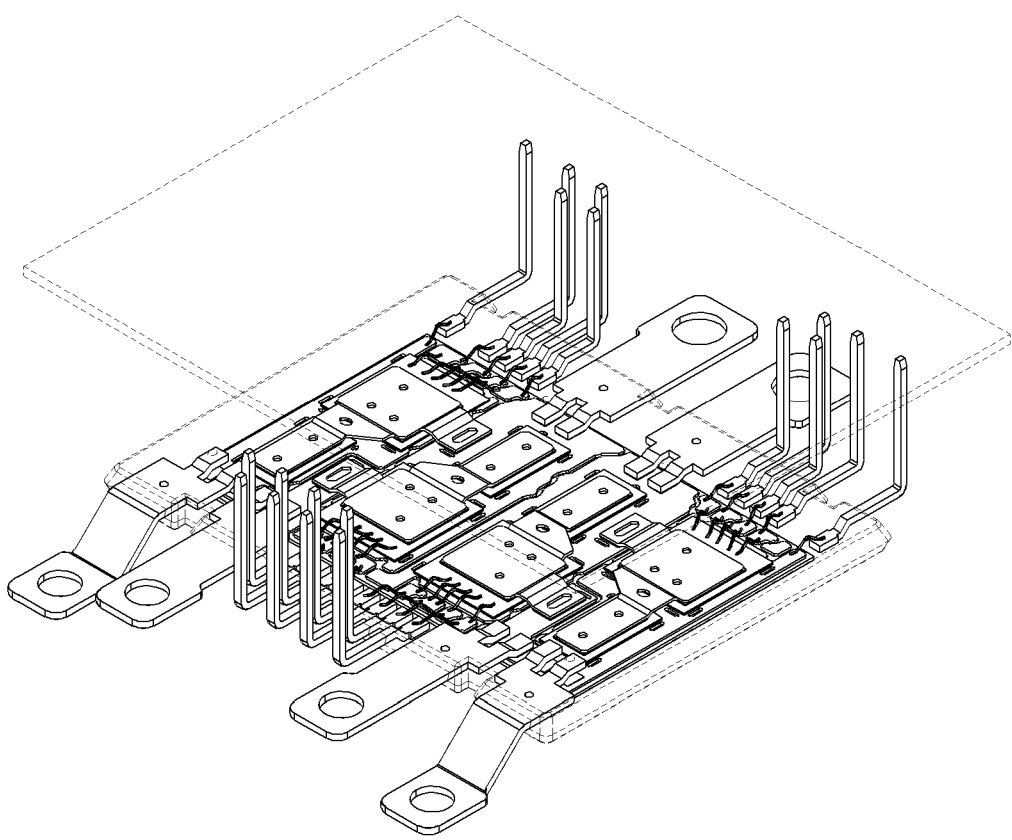
FIG. 2 is a perspective view illustrating a structure of a conventional power module.

The present invention will be described in detail with reference to the accompanying drawings. Here, a repeated description and detailed descriptions of known functions and configurations that may unnecessarily obscure the gist of the invention will be omitted. Embodiments of the present invention are provided in order to fully explain the present invention to those skilled in the art. Therefore, shapes and sizes of elements in the drawings may be exaggerated for clearer description.

Throughout this specification, when a certain part "includes" a certain component, other components are not excluded from being included unless explicitly described otherwise, and other components may further be included or provided.

Hereinafter, the exemplary embodiments of the invention will be described for promoting an understanding of the present invention. However, the following embodiments should be considered in a descriptive sense only and the scope of the invention is not limited to the following embodiments.

Hereinafter, a bidirectional signal pin module according to the present invention will be described in detail with reference to the accompanying drawings.

Figure 3A:
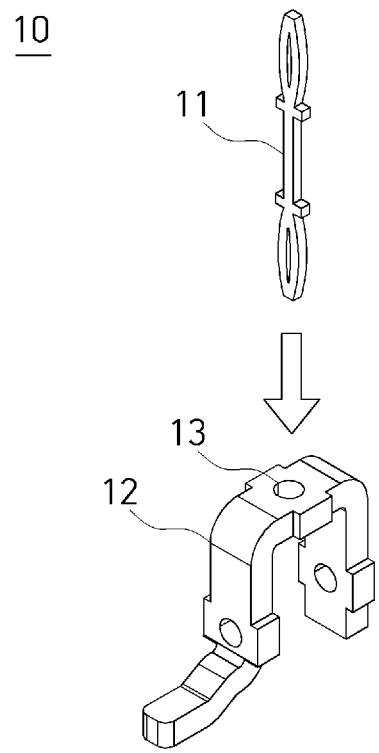
FIGS. 3A and 3B show perspective views illustrating a bidirectional signal pin module (10) according to the present invention.
Figure 3B:
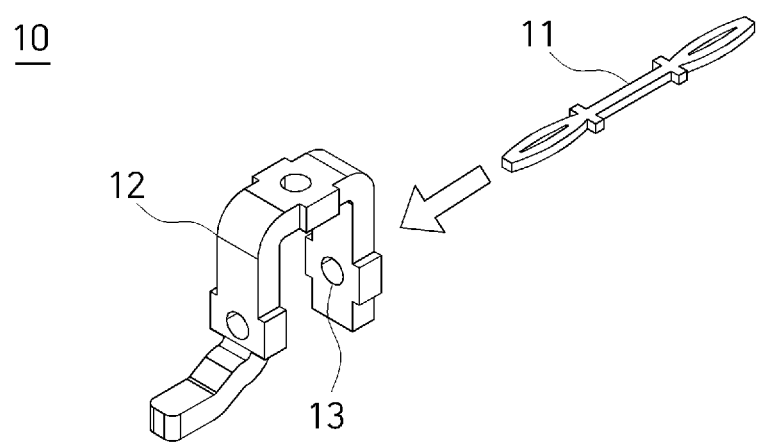

FIGS. 3A and 3B show perspective views illustrating a bidirectional signal pin module 10 according to the present invention. Referring to FIGS. 3A and 3B, the bidirectional signal pin module 10 according to the present invention includes a signal pin 11 and a socket 12.

The signal pin 11 according to the present invention may electrically connect two different objects.

The signal pin 11 is a medium, which electrically connects two objects and through which an electrical signal is transmitted, and any one object may transmit a control signal to control another object. For example, in the power module, a control signal of a control board may be transmitted to a power board through the signal pin 11.

The signal pin 11 may be manufactured by performing a molding process, a machining process, and an injecting process on a conductive metal sheet through which electricity flows.

The socket 12 according to the present invention may fix the signal pin 11 in any one direction of horizontal and vertical directions.

The socket 12 may be formed in a bent body shape having bent portions, and the bent portions may be formed in a "c" shape.

Since the socket 12 has a "c" shape bent by 90°, when any one surface is a vertical surface, the other surface may extend in a horizontal direction.

In addition, a hole 13, into which signal pin 11 is fitted, may be formed in each surface of the socket 12 having the "c" shape.

Accordingly, the socket 12 may be coupled to the signal pin 11 in the vertical or horizontal direction.

Referring to FIGS. 3A and 3B, it may be seen that the hole 13 is formed in each of the bent portions of the socket 12.

In addition, referring to FIG. 3A, it may be seen that the signal pin 11 is coupled to the socket 12 in the vertical direction, and referring to FIG. 3B, it may be seen that the signal pin 11 is coupled to the socket 12 in the horizontal direction.

In this case, the signal pin 11 may be coupled to the socket 12 in a press-fit connection manner.

In the press-fit connection manner, an indenter may use a pressure to push and fit the signal pin 11 into the hole 13 of the socket 12 so as to perform cold welding in which a contact surface of the signal pin 11 and a contact surface of the hole 13 are pressed against each other.

In this case, since a central portion of the signal pin 11 is formed of a flexible material, when a press-fit process is performed, the signal pin 11 absorbs a force and is deformed due to an elastic property thereof, and thus the deformation of the hole 13 may be minimized.

In addition, due to the press-fit connection manner, the signal pin 11 is pressed against the hole 13 by a minimum pressure, and thus a tight mechanical coupling property may be achieved.

Hereinafter, the power module according to the present invention will be described in detail with reference to the accompanying drawings.

Figure 4:
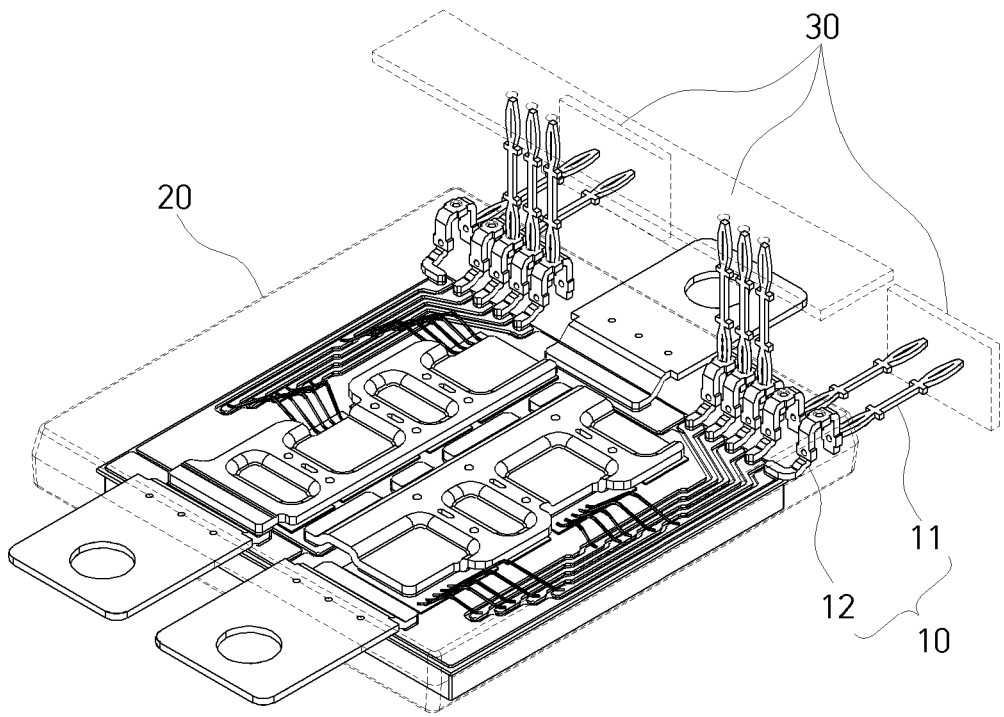
FIG. 4 is a perspective view illustrating a power module (100) according to the present invention.

FIG. 4 is a perspective view illustrating a power module 100 according to the present invention; and Referring to FIG. 4, the power module 100 according to the present invention includes bidirectional signal pin modules 10, a power board 20, and control boards 30.

The power module 100 according to the present invention is a module to which the bidirectional signal pin modules 10 are applied, and the bidirectional signal pin modules 10 may electrically connect the power board 20, which will be described below, and the control boards 30.

The power board 20 according to the present invention may receive an electrical signal through a switching element.

The power board 20 is formed as a board on which busbar patterns, through which the electrical signal is received, are formed, and the bidirectional signal pin modules 10 are fitted and soldered to a plurality of holes formed between the busbar patterns.

Accordingly, the power board 20 receives a signal of the control board 30, which will be described below, through the bidirectional signal pin module 10.

The control board 30 according to the present invention may transmit a signal to the power board 20.

The one or more control boards 30 each may have any one of current and temperature control properties.

In addition, the control board 30 may be connected to the power board 20 through the bidirectional signal pin module 10 in the horizontal or vertical direction.

For example, the control boards 30 may include two control boards including a current control board and a temperature control board, the current control board may be connected to the bidirectional signal pin module 10 in the horizontal direction, and the temperature control board may be connected to the bidirectional signal pin module 10 in the vertical direction.

Accordingly, since the signal pin 11 may be individually designed, in the power module 100 according to the present invention, customized signal connection may be performed by the bidirectional signal pin module 10 capable of connecting the power board 20 and the control board 30 in the horizontal or vertical direction.

Accordingly, the plurality of control boards 30 may be connected to one power board 20. In addition, since an effective layout of components in the power module 100 may designed due to the bidirectional signal pin modules 10, the power module 100 itself may be miniaturized.

Hereinafter, a method of manufacturing the power module according to the present invention will be described with reference to the accompanying drawings.

Figure 5:
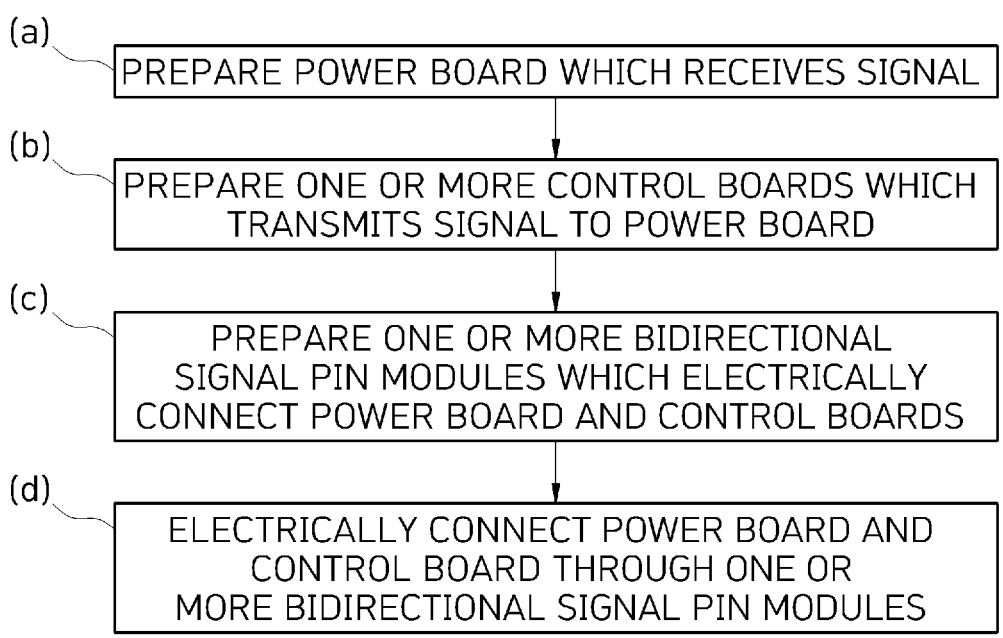
FIG. 5 is a flowchart illustrating a method of manufacturing the power module according to the present invention.

FIG. 5 is a flowchart illustrating a method of manufacturing the power module according to the present invention. Referring to FIG. 5, the method of manufacturing the power module according to the present invention may include four operations (a), (b), (c), and (d).

In operation (a) according to the present invention, the power board 20 may be prepared.

The busbar pattern capable of receiving an electrical signal through the switching element may be formed on the power board 20.

In operation (b) according to the present invention, one or more control boards 30 may be prepared.

The one or more control boards 30 may be prepared to each have any one control property of current and temperature control properties.

In operation (c) according to the present invention, one or more bidirectional signal pin modules 10 may be prepared to transmit a control signal of the control board 30 to the power board 20.

In the bidirectional signal pin module 10, the signal pin 11 may be fixed to the socket 12, through which an electrical signal may be transmitted and received, through a press-fit process.

The socket 12 may have the "⊂" shape having the bent portions and may be prepared in a state in which the hole 13 is formed in each bent surface and coupled to the signal pin 11 in any one direction of the horizontal and vertical directions.

In operation (d) according to the present invention, the power board 20 and the control board 30 may be electrically connected through the bidirectional signal pin module 10.

Since the bidirectional signal pin module 10 may connect the power board 20 and the control board 30 in any one direction of the horizontal and vertical directions, and the signal pin 11 may be individually designed at the same time, customized signal connection may be performed between the power board 20 and one or more control boards 30.

In other words, the plurality of control boards 30 may be connected to one power board 20. Accordingly, the control boards 30 may be prepared as two control boards including the current control board and the temperature control board, the current control board may be connected to the bidirectional signal pin module 10 in the horizontal direction, and the temperature control board may be connected to the bidirectional signal pin module 10 in the vertical direction.

In addition, the power board 20 and the control boards 30 may be connected by connecting the bidirectional signal pin modules 10, to which the press-fit process is applied, to the power board 20 and the control board 30 without performing a soldering process which is a conventional connection process.

Accordingly, an effect of reducing the number of processes of a manufacturing process of the power module 100 can be obtained.

According to the present invention, an effect of miniaturizing a power module can be obtained by applying a bidirectional signal pin socket in a horizontal or vertical direction.

In addition, an effect of customized signal connection of the power module can be obtained by individually designing a signal pin.

In addition, an effect of minimizing an arrangement of components and simplifying a process can be obtained by securing a degree of design freedom for the power module.

While the present invention has been described with reference to the exemplary embodiments thereof, it will be understood by those skilled in the art that the present invention may be variously changed and modified without departing from the spirit and scope of the invention defined by the appended claims.

What is claimed is:

1. A bidirectional signal pin module, comprising:
a signal pin configured to electrically connect two objects; and
a socket having a bent body shape including bent portions, wherein the bent portions include holes disposed in a horizontal direction or a vertical direction and configured to fix the signal pin in either one of a horizontal direction and a vertical direction,
wherein the bent portions of the socket include a pair of leg portions having the holes through which signal pins are coupled horizontally, and a connecting portion connecting upper portions of the pair of leg portions and forming the hole through which signal pins are vertically coupled.

2. The bidirectional signal pin module of claim 1, wherein the signal pin is configured to be coupled to the socket in a press-fit connection manner.

3. A power module, comprising:
a power board configured to receive a signal;
a control board configured to transmit the signal to the power board; and
a bidirectional signal pin module electrically connecting the power board and the control board to each other,
wherein the bidirectional signal pin module comprises
a signal pin configured to electrically connect two objects; and
a socket having a bent body shape including bent portions, wherein the bent portions of the socket include a pair of leg portions having the holes through which signal pins are coupled horizontally, and a connecting portion connecting upper portions of the pair of leg portions and forming the hole through which signal pins are vertically coupled.

4. The power module of claim 3, wherein the control board has either one of a current control property and a temperature control property.

5. The power module of claim 3, wherein the bidirectional signal pin module includes a socket fixing the signal pin, wherein the signal pin is configured to have the signal transmitted or received therethrough.

6. The power module of claim 5, wherein the signal pin is fixed to the socket in either one of a horizontal direction and a vertical direction.

7. The power module of claim 3, wherein the bidirectional signal pin module connects the power board and the control board to each other in either one of a horizontal direction and a vertical direction.

8. The power module of claim 3, wherein the bidirectional signal pin module is configured to connect the control board to the power board.

9. The power module of claim 3, further comprising:
another control board configured to transmit another signal to the power board; and
another bidirectional signal pin module electrically connecting the power board and the other control board to each other.

10. The power module of claim 9, wherein the bidirectional signal pin module connects the power board and the control board to each other in a horizontal direction, and
wherein the other bidirectional signal pin module connects the power board and the other control board to each other in a vertical direction.

11. A method of manufacturing the power module of claim 3, comprising:
configuring the power board to receive a signal;
configuring the control board to transmit the signal to the power board;
configuring the bidirectional signal pin module electrically connecting the power board and the control board to each other; and
electrically connecting the power board and the control board to each other through the bidirectional signal pin module.

12. The method of claim 11, wherein the configuring of the control board includes configuring the control board to have either one of a current control property and a temperature control property.

13. The method of claim 11, wherein the preparing of the bidirectional signal pin module includes fixing a signal pin, to have the signal is transmitted or received therethrough, to a socket.

14. The method of claim 13, further comprising fixing the signal pin to the socket in either one of a horizontal direction and a vertical direction, through a press-fit process.

* * * * *